(No Model.)
2 Sheets—Sheet 1.

E. M. HEYLMAN.
DISK PLOW.

No. 606,412.  Patented June 28, 1898.

ATTEST
Nora Graham.
Ina C. Graham.

INVENTOR
E. M. HEYLMAN
by L. P. Graham
his attorney (No Model.) 2 Sheets—Sheet 2.
E. M. HEYLMAN.
DISK PLOW.
No. 606,412. Patented June 28, 1898.
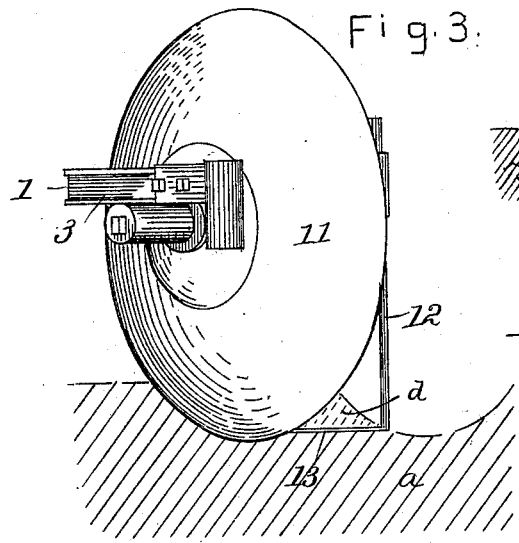
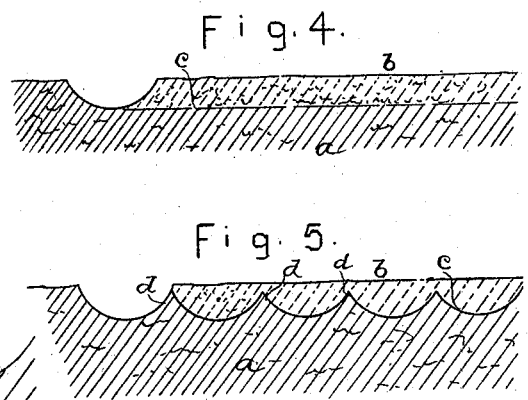
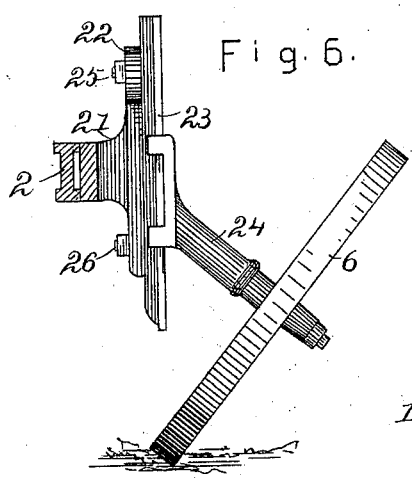
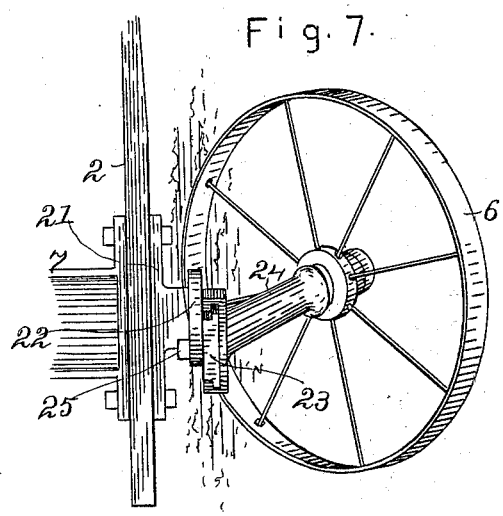
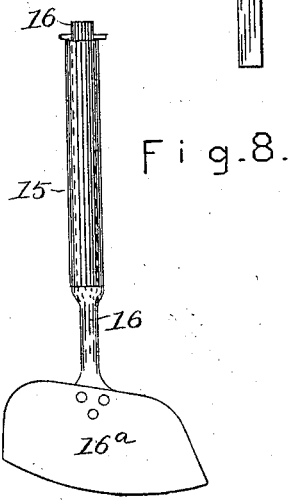
ATTEST.
Ina Graham.
Nora Graham
INVENTOR
E. M. HEYLMAN.
by his attorney
L. P. Graham

UNITED STATES PATENT OFFICE.

EDWARD M. HEYLMAN, OF CANTON, ILLINOIS, ASSIGNOR TO THE PARLIN & ORENDORFF COMPANY, OF SAME PLACE.

DISK PLOW.

SPECIFICATION forming part of Letters Patent No. 606,412, dated June 28, 1898.

Application filed August 27, 1897. Serial No. 649,760. (No model.)

*To all whom it may concern:*

Be it known that I, EDWARD M. HEYLMAN, of Canton, in the county of Fulton and State of Illinois, have invented certain new and useful Improvements in Disk Plows, of which the following is a specification.

In the ordinary operation of disk plows a small unplowed ridge of generally triangular conformation is left between each pair of conjoining furrows, to the detriment of subsequent planting and cultivating operations, and it is not an easy matter to force the disks into the ground. It is one object of my invention to overcome these difficulties.

Another object is to provide improved and simplified means for changing the direction in which carrying-wheels tend to travel.

The improvements are exemplified in the structure hereinafter described, and they are defined in the appended claims.

Figure 1:
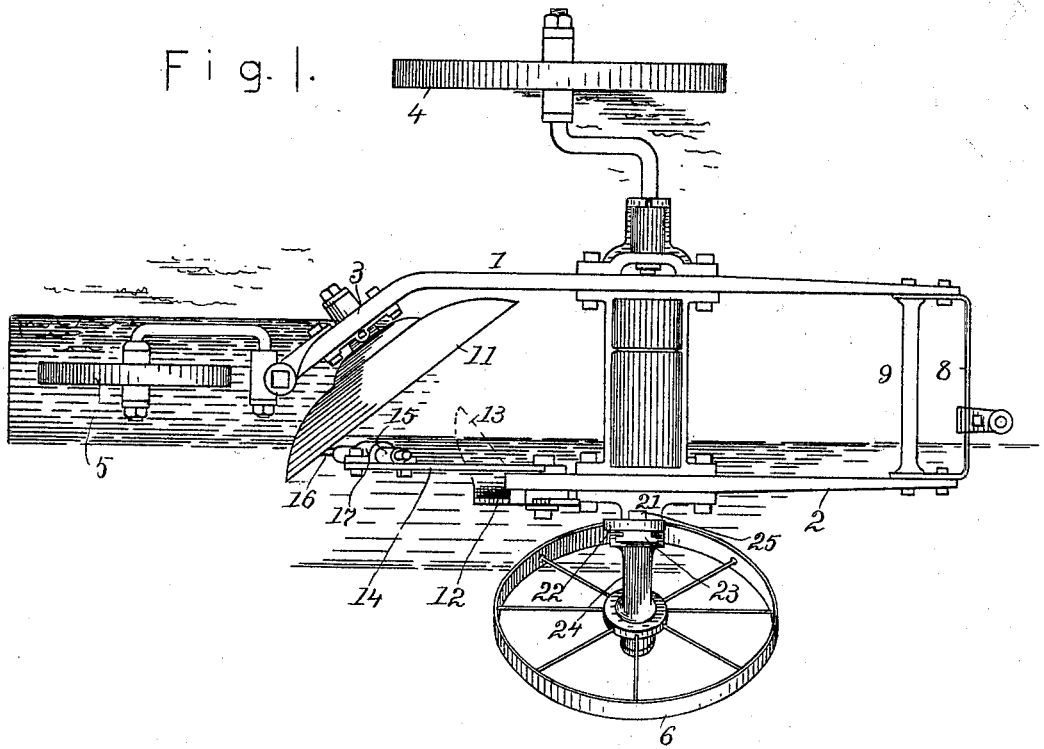
Figure 2:
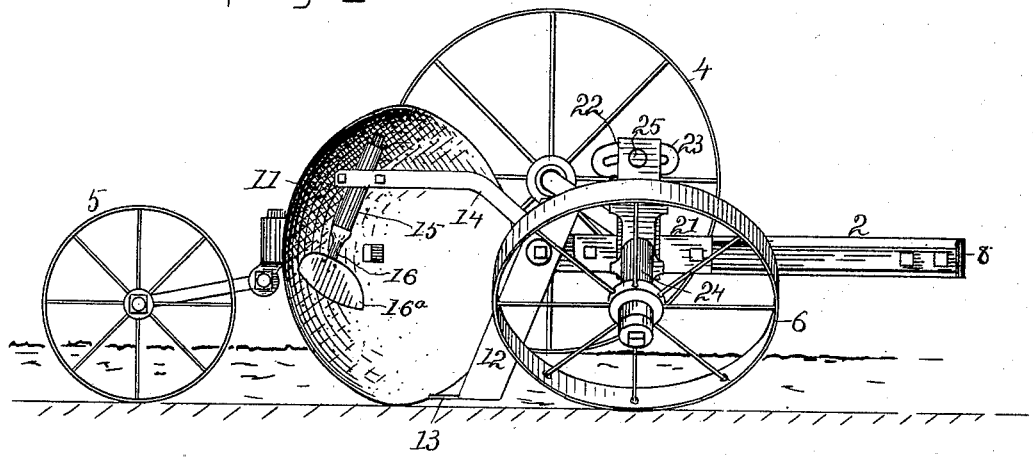

In the drawings forming a part of the specification, Figure 1 is a plan of so much of a plow as is needed to explain the invention. Fig. 2 is a side elevation of the structure shown in Fig. 1. Fig. 3 is a rear elevation of the disk of the plow and certain novel adjuncts thereof. Fig. 4 is a diagram illustrative of the line established between the soil turned by a plow equipped with my improvements and the unplowed ground beneath. Fig. 5 is a similar diagram showing the condition that one feature of my improvement is designed to obviate. Fig. 6 is a rear elevation of the inside carrying-wheel, showing details providing for adjustment thereof. Fig. 7 is a plan of the inside carrying-wheel adjusted to travel toward the land. Fig. 8 is a detail of the scraper used to clean the disk.

In building a plow in accordance with my invention a frame is constructed in any desired manner and supplied with suitable carrying-wheels. In this instance the frame consists of bars 1 and 2, joined together by means of cross-pieces 7, 8, and 9, and the rear end of bar 1 is bent obliquely toward the center of the frame, as shown at 3. The carrying-wheels 4, 5, and 6 are located one on each side and one behind the frame, and with the exception of wheel 6 they have no peculiarities bearing directly on the subject of this invention. The disk 11 is journaled on the oblique extension 3 of bar 4. It has no distinguishing peculiarities, and its tendency is to cut a series of concave furrows between which rise ridges of unplowed ground, as shown in Fig. 5, where *b* represents plowed ground, *a* represents the underlying unplowed ground, *c* represents the line between the plowed and the unplowed ground, and *d* represents the ridges left standing between furrows. The mechanism used to level the ridges *d* and aid in drawing the disk into the ground consists of a standard 12, which is supplied on its lower end with a laterally-extended cutter 13. The standard is fastened at its upper end to the rear end of bar 2 of the plow-frame, and it extends obliquely downward and backward therefrom. Generally speaking, the standard occupies a position in front of the rear edge of the disk, and alongside the front edge of the disk it extends to the plane of the lower edge of the disk, and the blade 13 extends obliquely backward in an approximately horizontal plane. The blade is located to the rear of a line drawn through the centers of wheels 4 and 6, and its tendency is, on account of this location, to hold the disk in the ground. The standard inclines backward in a manner to give clearance between it and the wheel 6, and this inclination also enables the blade to better perform its function.

The backward-inclined standard tends to depress trash and ride over or cut through it rather than to raise and carry it, as would be the case if the inclination were forward and downward, and the action on the blade is a pull rather than a push, insuring steadier action of the blade and less disposition to waver or tremble in the ground.

As the plow is drawn along the field by force exerted through draft-hitch 10 the lower end of standard 12 runs along the bottom of the concavity of the furrow last formed and the blade 13 extends horizontally through the soil that would, if undisturbed, form a ridge *d* of unplowed ground. This operation, which is exemplified in Figs. 1, 2, and 3, severs the ridge at its base in advance of the travel of the disk, and subsequently the soil of the ridge is turned aside by the action of the plow, and the line *c* between the plowed and the unplowed ground is made straight, as shown in Fig. 4.

The wheel 6, which travels in the furrow last completed, requires to be adjusted at times in order to throw the plow to or from the land, and in this instance the change in the direction of travel is made by the simple expedient of swinging the wheel-spindle forward or backward in a line parallel with the direction of travel of the plow, or, in other words, the equivalent of side turn is obtained by a forward or backward swing. To provide for this result, a bracket 21, which has a vertical extension of considerable length, is fastened to a side of bar 2 of the plow-frame, and the upper end 22 of the vertical extension has an arc-formed slot. A standard 23 is pivoted at 26 to the lower end of the vertical extension of the bracket, and its upper end is secured by means of a bolt 25, which extends through the arc-formed slot in the upper end of the bracket. A spindle 24 extends obliquely downward from the standard, and on this spindle, at right angles therewith, is journaled the wheel 6.

When the spindle points as nearly as possible directly downward, as shown in Fig. 1, the tendency of the wheel is to run directly forward. When the spindle is pointed forward, as shown in Fig. 7, the wheel tends to run to land, and if the spindle should be pointed backward the wheel would tend to run away from the land. The different positions of the wheel and spindle are obtained by rocking the standard 23 backward or forward on bolt 26 and fastening it in any desired position by bolt 25; but in the broadest sense of the invention it is immaterial by what means the spindle is adjusted backward or forward.

The scraper for the disk consists of a sleeve 15, a shank 16, journaled in the sleeve, and a scraper-blade 16ª, fixed on an end of the shank. The sleeve is clamped firmly to a bar 14, which extends rearward from the rear end of bar 2, and it extends obliquely backward and downward from the clamp 17.

The scraper-blade turns freely in its elongated bearing in the sleeve and automatically adapts itself to the surface of the disk. While the shank is sufficiently rigid to resist the stress incident to its function it yields sufficiently to permit the soil to draw the scraper closely against the disk, and its inclination toward the disk causes the soil to develop a drawing tendency.

What I claim as new, and desire to secure by Letters Patent, is—

1. In a plow the combination of a furrow-forming disk, an oblique standard having its upper end in advance of its lower end, and a horizontal blade on the lower end of the standard adapted to cut away the ridges between furrows, substantially as described.

2. In a disk plow, the combination of a disk, a beam in front of the disk, a sleeve secured to the beam and extended obliquely toward the face of the disk, a shank journaled loosely in the sleeve and a scraper on the shank presented to the disk, substantially as described.

In testimony whereof I sign my name in the presence of two subscribing witnesses.

EDWARD M. HEYLMAN.

Attest:
F. D. WOLCOTT,
J. B. HOFFMAN.